United States Patent [19]
Filipin et al.

[11] 3,900,339
[45] Aug. 19, 1975

[54] METHOD FOR WASHING A VESSEL IN A HERMETICALLY CLOSED CHAMBER

[76] Inventors: Nikolai Andreevich Filipin, V.O. Nalichnaya ul., 36, korpus 6, kv. 110; Jury Vladimirovich Alexander, Naberezhnaya reki Fontanki, 165, kv. 13; Jury Alexandrovich Poddubny, Pushkin, Shkolny pereulok, 29, kv. 24; Valentin Sergeevich Mozhzhukhin, ul. Sofii Kovalevskoi, 5, korpus 4, kv. 45, all of Leningrad; Petr Petrovich Neugodov, Novye Cheremushki, kvartal 34a, korpus 8, kv. 51, Moscow, all of U.S.S.R.

[22] Filed: July 7, 1972

[21] Appl. No.: 269,585

[52] U.S. Cl............... 134/22 R; 134/25 A; 134/30
[51] Int. Cl............................ B08b 3/00; B08b 9/00
[58] Field of Search............ 134/11, 12, 22 R, 25 A, 134/31, 21, 30; 21/56, 97, 98, 99

[56] References Cited
UNITED STATES PATENTS

| | | | |
|---|---|---|---|
| 2,127,778 | 8/1938 | Lewis | 134/25 A |
| 2,256,663 | 9/1941 | Brewer | 134/25 A X |
| 2,475,407 | 7/1949 | Sell | 134/22 R X |
| 2,671,742 | 3/1954 | Cozzoli | 134/25 A X |
| 3,072,128 | 1/1963 | James | 134/11 X |

FOREIGN PATENTS OR APPLICATIONS

| | | | |
|---|---|---|---|
| 140,953 | 3/1960 | U.S.S.R. | 134/22 R |

*Primary Examiner*—Robert L. Lindsay, Jr.
*Assistant Examiner*—Richard V. Fisher

[57] ABSTRACT

A method of washing vessels, for example ampules, wherein a vessel is placed in a closed chamber, the chamber and the vessel are filled with steam or vapor, and with the neck of the vessel immersed in a washing liquid, the pressure of the steam or vapor in the chamber is increased, which leads to filling of the vessel with the washing liquid, and then the steam or vapor is cooled until it condenses, which leads to the removal of the washing liquid from the vessel.

4 Claims, 3 Drawing Figures

METHOD FOR WASHING A VESSEL IN A HERMETICALLY CLOSED CHAMBER

The present invention relates to methods of washing vessels, for example ampules.

A method is known for washing vessels wherein the vessels are placed in a steam medium, and after the air in the vessels has been replaced by steam, the neck of the vessel is immersed in the washing liquid, while the body of the vessel is subjected to external cooling, as a result of which the steam inside the vessel condenses, and the vessel is filled with the washing liquid. Next, by supplying heat from an external source, the washing liquid in the vessel is heated to its boiling point, and as a result of evaporation of part of the washing liquid the vessel is filled with vapor (steam), and the liquid is displaced from it.

A device for carrying out the method comprises a through chamber open at its ends in which there are alternately arranged, with a definite spacing, infrared heaters, water coolers and tanks containing the washing liquid. The vessels to be washed are attached to movable holders with their necks facing downward and they are carried by the holders along the chamber, alternately passing through zones of heating and cooling, in the cooling zones the vessels being immersed with their necks into the tanks with the washing liquid.

The principal shortcoming of the known method of washing vessels is the considerable expenditure of energy as a result of great losses of heat and steam to the surrounding space.

Another shortcoming of the known method is the low rate of displacing the washing liquid from the vessels, which is due to the difficulty in supplying the considerable amount of heat required for heating the liquid in the vessel to its boiling point and for evaporation of part of the liquid.

The difficulty of supplying heat is aggravated by the low thermal conductivity of the glass of which the majority of vessels are made, and the small dimensions of the vessels. The low rate of displacing the washing liquid leads to the danger that mechanical impurities in the washing liquid may settle on the walls of a vessel, in particular at the constriction near its neck.

The embodiment of the cited method is effective from the viewpoint of heating conditions only if the vessels being washed are arranged in one row. Consequently, to obtain a high output of the device, it is essential either to considerably increase its dimensions or to install heaters that will supply a very high rate of heat energy, which is difficult from the standpoint of design and is not economical.

Another shortcoming of the known device is the fact that when it is necessary to increase the number of recirculations of the liquid in the vessels in order to improve the effectiveness of washing, either the vessels being washed must be repeatedly conducted through the device, which leads to a more complicated design of the conveying means, or the number of heating and cooling zones and tanks of washing liquid must be increased, which leads to an increase in the dimensions and a more complicated design of the device.

The known shortcomings of the device also include the necessity of conveying the vessels during their treatment in a steam medium through zones of different temperature, which produces certain difficulties in the design of the conveying means.

An object of the present invention is to provide a method of washing vessels that makes it possible, while retaining intensive and complete filling of the vessels with the washing liquid, to improve the quality of washing the vessels, reduce the energy demand of the process and increase its speed.

Another object of the present invention is to provide a method for washing vessels that makes it possible to simultaneously wash a considerable number of vessels, thus ensuring a high output with a device of small dimensions.

Still another object of the present invention is to provide a method that makes it possible, in the case of extremely dirty vessels, to effect any number of circulations of the washing liquid in a vessel and to use several kinds of washing liquids, and also to use means for intensifying the washing process, for example, ultrasonic oscillations or surfactants.

These objects are achieved by providing a method of washing vessels, for example ampules, by filling a vessel with steam, next filling the vessel with a washing liquid by condensation of the steam in the vessel upon lowering the neck of the vessel into washing liquid, and then displacing the washing liquid from the vessel by the formation of steam in it, wherein, according to the invention, the vessel is placed in a closed chamber and after filling it with steam and immersing the neck of the vessel into the washing liquid, steam is fed into the chamber at a pressure ensuring the condensation of the steam inside the vessel and its filling with the washing liquid, after which the steam in the chamber is condensed by cooling to a pressure ensuring the evaporation (boiling) of the washing liquid inside the vessel and the displacement therefrom of the washing liquid. Although steam has been referred to hereinabove, this is used by way of example and other vapors can also be used.

It is expedient to fill a vessel with steam by alternately admitting steam under pressure into the chamber and condensing it by cooling, accompanied by a drop in pressure.

The steam in the chamber can be cooled for its condensation by injecting a cooling liquid into the chamber.

A device for washing vessels according to the method of the present invention comprises a closed chamber containing a holder for supporting the vessels with their necks downward, said holder being provided with means for its vertical displacement, nozzles for spraying a cooling liquid into the closed chamber, and pipes for supplying the washing liquid and steam and for draining off the washing liquid, cooling liquid and condensate.

Another device for washing vessels according to the method of the present invention comprises a closed chamber containing a holder for supporting the vessels with their necks downward, a tank arranged under the holder and provided with connecting pipes for supplying to it and removing from it the washing liquid, nozzles for spraying the cooling liquid so arranged in the chamber that the liquid being sprayed will not get into the said tank for the washing liquid, and also pipes for supplying steam into the closed chamber and for removing therefrom the cooling liquid and condensate.

Still another device for washing vessels according to the method of the present invention comprises a closed chamber containing a holder for supporting the vessels with their necks downward and pipes for supplying to it steam and the washing liquid and for removing the washing liquid, said chamber communicating with an additional chamber provided with nozzles for spraying the cooling liquid and pipes for supplying steam to it and draining from it the cooling liquid and condensate.

The advantages of the proposed method of washing vessels consist in a considerable reduction of the energy required for the process, and also the possibility of reducing the use of costly electric energy in favor of less expensive steam.

The proposed method makes it possible to simultaneously wash considerable batches of vessels regardless of their shape and geometrical dimensions.

The proposed method ensures complete filling of the vessel being washed with the washing liquid, without any residual air, this being especially important when using means for intensifying the cleaning such as ultrasonic oscillations or surfactants.

The present method ensures a high rate of removal of the washing liquid from the vessels being cleaned, as a result of which effective removal of all mechanical dirt separated from the walls of the vessel is achieved. It can be indicated by way of example, that the removal of the washing liquid from an ampule with a rated capacity of 10 cubic centimeters takes place in 0.1 to 0.5 seconds, depending on the diameter of the capillary.

The proposed method makes it possible to exclude the influence of the thermal conductivity of the material of the vessel, its shape and dimensions on the rate of inflow of the washing liquid into the vessel and its removal therefrom, since these parameters do not depend on the conditions of heating and cooling of the vessels themselves, but on the pressure in the closed chamber, which can be changed in a very short interval of time.

In comparison with the devices embodying the known method, the device according to the method of the present invention requires a much lower expenditure of energy, ensures the possibility of simultaneously washing considerable numbers of vessels, makes it possible without complications in design to conduct any preset number of circulations of the washing liquid, to use several kinds of washing liquid, to use a cooling liquid whose mixing with the washing liquid is not allowable, and also to use means for the intensification of washing and to exclude the necessity of conveying the vessels during the washing process.

The nature of the present invention will become more fully apparent from a consideration of the following description of exemplary embodiments thereof, taken in conjunction with the accompanying drawings, in which.

Figure 1:
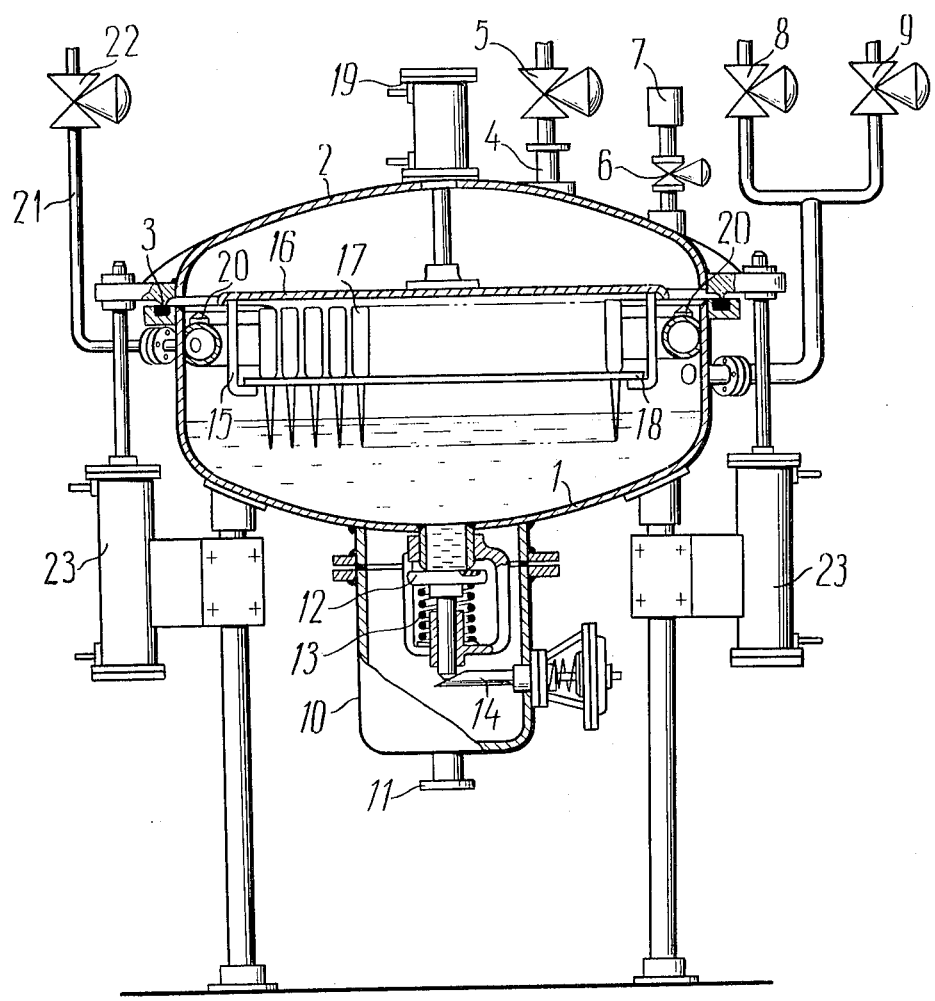
FIG. 1 is a schematic longitudinal section of the device for washing vessels according to the invention.

The device for washing vessels comprises a closed chamber formed by washing tank 1 (FIG. 1) with cover 2 hermetically sealed with the aid of packing 3. Tank 1 is connected by means of pipe 4 and valve 5 to a steam generator (not shown).

Said washing tank 1 has the possibility of communicating with the atmosphere through valve 6 and filter 7. Washing tank 1 is connected, by pipes provided with valves 8 and 9, to pressure tanks for the washing liquids (not shown in the drawing), and it is also connected to drain tank 10 provided with drain pipe 11. Tank 1 is connected to drain tank 10 by means of valve 12 which is spring-loaded by spring 13 and provided with fixing means 14. Washing tank 1 contains stops 15 connected to limiter 16 which prevents vertical motion of vessels 17 being washed, the vessels being installed in holder 18 resting on stops 15. Stops 15 together with limiter 16 are installed on cover 2 for vertical movement by means of hydraulic or pneumatic cylinder 19.

Washing tank 1 is provided with nozzles 20 for the spraying of a cooling liquid. Nozzles 20 are connected by means of pipe 21 and valve 22 to a cooling liquid supply (not shown). Cover 2 is secured to hydraulic or pneumatic cylinders 23 for raising and lowering the same. Cover 2 can also be provided with locking means (not shown) which prevents its opening under the action of the pressure in washing tank 1.

Figure 2:
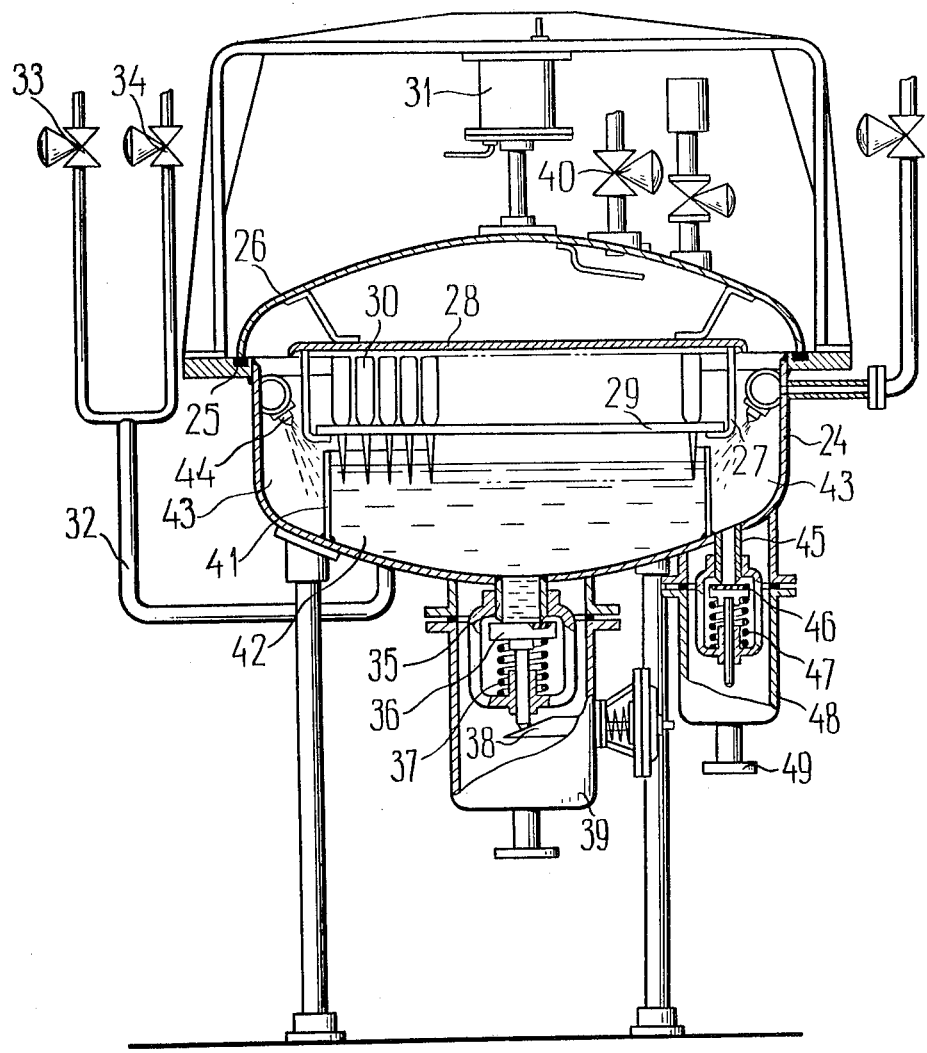
FIG. 2 is a longitudinal section of a different embodiment of the device for washing vessels according to the invention.

When mixing of the washing and cooling liquids is not allowable, the device for washing vessels can be designed as shown in FIG. 2. This device comprises washing tank 24 with cover 26 hermetically closed by means of packing 25. Holder 29 of vessels 30 being washed is installed inside washing tank 24 on stops 27 connected to limiter 28 secured to cover 26. Cover 26 of tank 24 is provided with a hydraulic or pneumatic cylinder 31 to raise and lower it. Washing tank 24 is connected by means of pipe 32 and valves 33 and 34 to tanks or pipes for the supply of the washing liquids (not shown). The tank 24 is connected to drain tank 39 by pipe 35, valve 36, spring-loaded by spring 37 and fixing means 38.

Pipe 40 serves for feeding steam to washing tank 24.

Secured to the bottom of washing tank 24 is an annular partition 41 which divides the lower part of the inner space of washing tank 24 into two parts, viz.—space 42 serving as a reservoir for the washing liquid, and space 43 serving as a reservoir for the cooling liquid, space 42 communicating with drain tank 39.

Nozzles 44 installed inside washing tank 24 are so directed that the cooling liquid sprayed by them does not enter space 42, but is collected in space 43.

Space 43 is connected by means of pipe 45 and valve 46, spring-loaded by spring 47, to drain tank 48 for the spent cooling liquid, said tank being provided with drain pipe 49.

Figure 3:
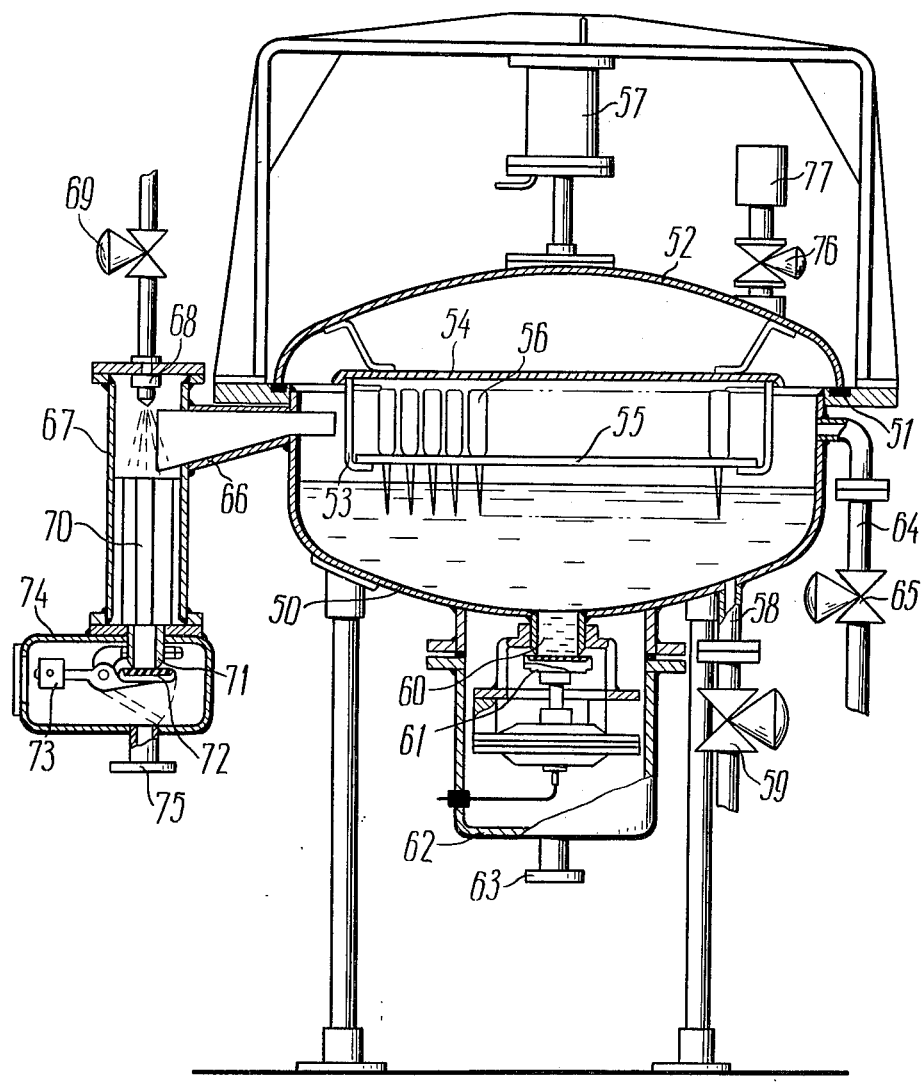
FIG. 3 is a longitudinal section of an embodiment of the device for washing vessels according to the invention with an additional chamber.

Another embodiment of a device for washing vessels which does not allow mixing of the washing and cooling liquids is shown in FIG. 3. This device comprises washing tank 50 with a cover 52 hermetically closed by means of packing 51. Vessels 56 being washed are installed in a holder 55 resting on stops 53 connected to limiter 54 which is secured to cover 52.

The cover 52 of the washing tank is connected to a hydraulic or pneumatic cylinder 57 for being raised or lowered, and clamping means (not shown) prevents opening of the cover under the action of the pressure in washing tank 50.

Washing tank 50 is provided with a pipe 58 and valve 59 for supplying the washing liquid, and a pipe 60 with valve 61 is connected to the washing tank for communication with drain tank 62 provided with drain pipe 63. Washing tank 50 is connected by means of pipe 64 and valve 65 is connected to the steam delivery pipe and is connected by pipe 66 to additional chamber 67. Nozzle 68 is installed in additional chamber 67 for injecting cooling liquid into the steam medium. Valve 69 is installed on the pipe supplying the cooling liquid to nozzle 68. In order to increase the heat exchange surface ribs 70 can be formed on the internal surface of additional chamber 67 or Raschig rings can be installed in this additional chamber. The lower part of additional chamber 67 is provided with pipe 71, having valve 72 loaded with weight 73, for communication with drain tank 74 provided with drain pipe 75 for removing the spent cooling liquid and condensate. A pipe with a valve 76 and a filter 77 is provided for connecting the internal space of washing tank 50 to the atmosphere.

Radiators of ultrasonic oscillations (not shown) can also be installed in the washing tank for intensifying the washing process.

Any known automatic control system can be used for controlling the operation of all the members of the device.

The method of washing vessels is carried out as follows.

Vessels 17 (FIG. 1) to be washed are placed in holders 18 which are supported in washing tank 1 between stops 15 and limiter 16 so that the necks of vessels 17 face downward. After this the cover 2 of washing tank 1 is hermetically closed by means of pneumatic cylinders 23. Next, valve 5 is opened and steam is supplied into washing tank 1. At this moment valve 12 is pressurized by the pressure of the steam in washing tank 1 and is held by spring 13. The pressure in washing tank 1 is determined by the pressure at which the steam is supplied from the source, and the tension of spring 13 on valve 12. Air is expelled from washing tank 1 through valve 12, and tank 1 is filled with steam. Next steam delivery valve 5 is closed, and valve 12 closes automatically under the action of spring 13. The pressure in washing tank 1 is reduced by cooling the steam until it condenses. The steam is cooled by injecting the cooling liquid through nozzles 20.

The steam can also be cooled by cooling the walls of washing tank 1, or by a heat exchanger arranged in tank 1. Upon a reduction in the pressure in washing tank 1 the air in vessels 17 being washed flows out therefrom into washing tank 1. Upon the following admission of steam into tank 1 the air discharged from vessels 17 is displaced by the steam from tank 1 through valve 12, and vessels 17 are partly filled with steam. When the processes of increasing and reducing the pressure in washing tank 1 are repeated several times, the air in vessels 17 and washing tank 1 will be completely replaced by steam. Satisfactory results are achieved when this process is repeated only two times.

Further, when the pressure in washing tank 1 is reduced, the washing liquid is supplied to the latter through valve 8 or 9.

Water-main water, distilled water, aqueous solutions of surfactants and various organic solvents such as alcohol, toluene and methylene chloride can be used as the washing liquid. If organic solvents are used, it is expedient to use the vapors of these liquids as the working medium for increasing and reducing the pressure in washing tank 1, although the use of steam is also not excluded.

Before delivery into washing tank 1, the washing liquid is heated by any known method to a temperature below the boiling point of this liquid at the maximum pressure achieved in washing tank 1.

Thus, if water is used as the washing liquid and if the maximum pressure in washing tank 1 does not exceed atmospheric pressure, the temperature of the washing liquid should be within 70° to 80°C. When the maximum pressure in washing tank 1 is 3–5 atmospheres, the temperature of the water used as the washing liquid may be 120°–130°C. When solvents with a low boiling point are used as the washing liquid, for example, methylene chloride, the temperature of the washing liquid may be 20°–30°C.

It must be noted that the washing liquid may also be in washing tank 1 when the air therein is being replaced by steam (or vapor). In this case the air is displaced from tank 1 through valve 6, while valve 12 is closed by fixing means 14. Vessels 17 will be filled with the washing liquid. With such an embodiment of the process of replacing the air in tank 1 with steam, however, there will be a certain increase in the consumption of steam due to its condensation on the surface of the washing liquid and losses through valve 6, and the conditions of the replacement of the air in washing tank 1 by the steam will deteriorate somewhat. For this reason it is more expedient to introduce the washing liquid into washing tank 1 after it and vessels 17 are filled with steam.

The washing liquid is introduced into washing tank 1 up to a level at which the necks of all vessels 17 will be immersed in the washing liquid. Next the pressure in tank 1 is increased to a maximum, by injecting steam through valve 5. The steam in vessels 17 will condense and they will be filled with the washing liquid. Next the washing liquid is removed from tank 1 through valve 12 and the pressure in tank 1 is reduced by condensation of the steam, which is accomplished by injecting the cooling liquid through nozzle 20.

Other methods of cooling the steam (or vapor) are also possible, for example, by cooling the walls of tank 1 or, when working with the maximum and minimum pressures in tank 1 above atmospheric pressure, the pressure can be reduced by exhausting steam from tank 1 into the atmosphere through valve 6 (filter 7 is not installed in this case). Upon a reduction in the pressure, the washing liquid in vessels 17 boils as a result of the fact that the pressure of the washing liquid becomes lower than the pressure at which it boils at the given temperature. Upon boiling of the washing liquid, vessels 17 become filled with its vapor, and the liquid is discharged from vessels 17 at high velocity, carrying along the dirt. It should be noted that filling and emptying of vessels 17 being washed can be performed without removal of the washing liquid from washing tank 1, for example, by the joint lifting by means of cylinder 19 of holders 18 with vessels 17 and limiter 16. In this case valve 12 is closed by fixing means 14. At the moment preceding the reduction of the pressure in washing tank 1, the necks of vessels 17 are brought out of the washing liquid, after which the pressure in tank 1 is lowered and the washing liquid is discharged from vessels 17. Next, by lowering holders 18, the necks of vessels 17 are immersed in the washing liquid and the pressure in the washing tank 1 is increased, as a result of which the steam or vapor in vessels 17 condenses and they are filled with the washing liquid. The processes of filling and emptying the vessels can be performed without bringing the necks of vessels 17 out of the washing liquid. In this case, however, the rate of emptying vessels 17 will decrease somewhat.

Thus, vessels 17 can be filled with the washing liquid and emptied with the use of one portion of the washing liquid one or several times.

The devices shown in FIGS. 1 and 2 each has two valves — valves 8 and 9 (FIG. 1) and 33 and 34 (FIG. 2) for the washing liquid. The number of these valves may be greater, which makes it possible to wash the vessels with several washing liquids that differ both in purity and in composition.

Thus, for example, the spent washing liquid from the last washing cycle can be used as the washing liquid for the first washing cycle when cleaning a new batch of vessels.

It is absolutely clear that each washing liquid can be changed once or many times.

The process of washing after each change of the washing liquid is conducted in complete accordance with the process described above. The washing liquid is changed after the spent washing liquid has been removed from washing tank 1 (FIG. 1) and vessels 17, the washing liquid being preferably removed after the maximum pressure has been created in washing tank 1.

After completion of the washing process, vessels 17 can be sterilized by alternately supplying steam (vapor) into washing tank 1 and creating a vacuum. This is done by admitting steam into the washing tank, which causes an increase in the pressure, and then cooling it to effect condensation by injecting the cooling liquid, as a result of which a vacuum is formed.

This process can also be repeated many times. Upon the completion of the washing process and, when necessary, of sterilization, washing tank 1 is connected through valve 6 and filter 7 with the atmosphere, cover 2 is opened, and vessels 17 in holders 18 are extracted from the device.

Should mixing of the washing and cooling liquids not be permissible due to differences in their chemical compositions, their different degrees of purity, or because cooling of the washing liquid as a result of its mixing with the cooling liquid is not permitted, use is made of the device for washing vessels designed as shown in FIGS. 2 and 3.

The cooling liquid, sprayed by nozzles 44 (FIG. 2), collects in space 43 and, without mixing with the washing liquid in space 42, is removed from washing tank 24 through valve 46 into drain tank 48.

In the device shown in FIG. 3, the cooling liquid sprayed by nozzle 68 is collected in additional chamber 67 and is removed therefrom through valve 72 into drain tank 74.

What we claim is:

1. A method of washing a vessel with an open neck, comprising:
   a. placing a vessel in a hermetically closed chamber with its neck facing downwardly,
   b. filling said chamber and the internal space of said vessel with steam by feeding the steam into the chamber to expel air therefrom and surround the vessel with steam,
   c. filling the chamber with washing liquid to a level above the neck of the vessel,
   d. again introducing steam into said chamber this time at a sufficiently high temperature and pressure to increase the pressure of the steam in the vessel and cause condensation of this steam whereby the vessel becomes filled with the washing liquid which replaces the thus condensed steam and
   e. condensing the steam in said chamber around the vessel by cooling the steam in the chamber which reduces the pressure within the vessel to effect boiling of the washing liquid inside said vessel and its consequent removal therefrom.

2. A method according to claim 1, wherein the steam in the chamber is cooled in step (e) by injecting a cooling fluid into the chamber.

3. A method according to claim 2, wherein the cooling fluid is a washing liquid.

4. A method according to claim 1, wherein the chamber and internal space of the vessel are initially filled with steam in step (b) by feeding steam into the chamber to expel air therefrom, then cooling the steam around the vessel to condense the steam and reduce the pressure in the chamber whereby air is evacuated from the vessel, and then again introducing steam into the chamber which now fills the evacuated vessel and renders the same ready for step (c).

* * * * *